(12) United States Patent
Zheng (10) Patent No.: US 8,644,034 B2
(45) Date of Patent: Feb. 4, 2014

(54) SHIELD AND SERVER HAVING THE SAME

(75) Inventor: Yong-Liang Zheng, New Taipei (TW)

(73) Assignee: Wistron Corporation, New Taipei (TW)

(*) Notice: Subject to any disclaimer, the term of this patent is extended or adjusted under 35 U.S.C. 154(b) by 99 days.

(21) Appl. No.: 13/458,705

(22) Filed: Apr. 27, 2012

(65) Prior Publication Data

US 2012/0293946 A1  Nov. 22, 2012

(30) Foreign Application Priority Data

May 17, 2011  (CN) .......................... 2011 1 0127280

(51) Int. Cl.
*H05K 9/00* (2006.01)
*H05K 5/00* (2006.01)
*H05K 7/16* (2006.01)
*A47B 81/00* (2006.01)

(52) U.S. Cl.
USPC ........... 361/816; 361/818; 361/724; 361/727; 312/223.1; 312/223.2

(58) Field of Classification Search
USPC ............. 361/679.01–679.45, 679.55–679.59, 361/816, 818; 312/223.1, 223.2
See application file for complete search history.

(56) References Cited

U.S. PATENT DOCUMENTS

| | | | | |
|---|---|---|---|---|
| 6,373,695 B1 * | 4/2002 | Cheng | ....................... | 361/679.39 |
| 6,590,848 B1 * | 7/2003 | Chen | .............................. | 720/654 |
| 6,654,256 B2 * | 11/2003 | Gough | ........................... | 361/816 |
| 6,940,731 B2 * | 9/2005 | Davis et al. | ................... | 361/801 |
| 7,443,668 B2 * | 10/2008 | Hsu | .......................... | 361/679.33 |
| 7,561,444 B2 * | 7/2009 | He | ................................. | 361/818 |
| 7,835,148 B2 * | 11/2010 | Tu | ............................ | 361/679.39 |
| 2007/0114253 A1 | 5/2007 | Hsu | | |
| 2008/0130216 A1 * | 6/2008 | Tsai et al. | ..................... | 361/685 |

FOREIGN PATENT DOCUMENTS

TW           M400191           3/2011

OTHER PUBLICATIONS

Office Action dated Jul. 26, 2013 issued in corresponding Taiwanese Patent Application No. 100117565.

* cited by examiner

*Primary Examiner* — Jayprakash N Gandhi
*Assistant Examiner* — Nidhi Desai
(74) *Attorney, Agent, or Firm* — Stroock & Stroock & Lavan LLP (57) ABSTRACT

A shield is adapted be locked to a casing. The casing is formed with an inserting space, an opening, and two engaging holes. The shield includes a shell body, two engaging members and two biasing springs. The shell body is inserted into the inserting space, and shields the opening. The shell body includes a base plate formed with a slot, and two side plates each formed with a through-hole. Each of the engaging members is slidable relative to the base plate, and includes an engaging portion extending through the corresponding through-hole and releasably engageable with the corresponding engaging hole. Each of the biasing springs biases the corresponding engaging member to move in a direction toward the corresponding through-hole.

14 Claims, 13 Drawing Sheets

SHIELD AND SERVER HAVING THE SAME

CROSS-REFERENCE TO RELATED APPLICATION

This application claims priority of Chinese Application No. 201110127280.9, filed on May 17, 2011, the disclosure of which is incorporated herein by reference.

BACKGROUND OF THE INVENTION

1. Field of the Invention

The present invention relates to a server, and more particularly to a shield adapted to be locked to or detached from a casing through a locking mechanism and a server having the same.

2. Description of the Related Art

Typically, a casing of a server is provided with a plurality of hard disk modules. When a hard disk of one of the hard disk modules fails and needs maintenance, or when the server operates in a state in which plural hard disk modules are not required simultaneously, an operator may withdraw the hard disk modules not required from corresponding inserting spaces of the casing, so that the inserting spaces of the casing are exposed. Subsequently, the operator may insert shields respectively into the exposed inserting spaces.

Since conventional shields cannot be stably locked on the casing after they are inserted into the inserting spaces, the shields may be disengaged undesirably from the inserting spaces under vibration. As such, it is desirable to design a locking mechanism with a simple structure which enables one shield to be locked to or detached from the casing conveniently.

SUMMARY OF THE INVENTION

Therefore, an object of the present invention is to provide a shield, which can be conveniently and quickly locked to or detached from a casing.

Another object of the present invention is to provide a server having a shield that can be conveniently and quickly locked to or detached from a casing.

According to an aspect of this invention, a shield is adapted to be locked to a casing. The casing is formed with an inserting space, an opening, and two engaging holes spaced apart from each other in a left-to-right direction and in spatial communication with the inserting space. The shield includes a shell body, two engaging members and two biasing springs.

Preferably, the base plate is formed with two positioning grooves. Each of the engaging members includes a positioning arm formed with a positioning block engageable with a corresponding one of the positioning grooves such that, when the positioning block is engaged within the corresponding one of the positioning grooves, a corresponding one of the engaging members is at a release position where the engaging portion is disengaged from the respective one of the engaging holes.

Preferably, the positioning arm of each of the engaging members further includes a projection pushable to disengage the positioning block from the corresponding one of the positioning grooves.

Preferably, the shield further includes two joining members for joining the two engaging members respectively to the base plate. Each of the engaging members is formed with an elongated hole for the joining member to extend therethrough in the left-to-right direction. Each of the engaging members is slidable relative to the base plate in a longitudinal direction of a corresponding one of the elongated holes.

Preferably, each of the engaging portions of the engaging members is formed with a slope surface adapted to be contactable with the casing to allow each of the engaging portions to slide in a direction away from the through-hole of a corresponding one of the side plates.

Preferably, each of the side plates includes a front blocking plate disposed for slidable contact with a front end of a corresponding one of the engaging members, and a rear blocking plate disposed for slidable contact with a rear end of each of the corresponding one of the engaging members.

preferably, the shell body further includes a front plate connected to the base plate and front ends of two side plates and extending vertically. The front plate is adapted to shield the opening and is formed with a plurality of heat dissipation holes that are adapted to be in spatial communication with the inserting space and the outside. The base plate extends horizontally.

Preferably, the shell body further includes a contact plate extending horizontally from and connected to the front plate and spaced apart from the base plate. The contact plate includes a first resilient contact piece adapted to abut against the casing. Each of the side plates includes a second resilient contact piece adapted to abut against the casing.

According to another aspect of this invention, a server includes a casing and a shield. The casing is formed with an inserting space, an opening, and two engaging holes spaced apart from each other in a left-to-right direction and in spatial communication with the inserting space. The shield includes a shell body, two engaging members and two biasing springs. The shell body is inserted into the inserting space, and shields the opening. The shell body includes a base plate and two side plates disposed respectively at left and right sides of the base plate. The base plate is formed with a slot. Each of the side plates is formed with a through-hole aligned with a respective one of the engaging holes. Each of the engaging members is slidable relative to the base plate, and includes an engaging portion extending through a corresponding one of the through-holes and releasably engageable with a respective one of the engaging holes, and a pressing portion opposite to the engaging portion and aligned with the slot. Each of the biasing springs biases a respective one of the engaging members to move in a direction toward the corresponding one of the through-holes.

In view of the above-mentioned configurations and techniques, the server of the present invention has the following advantage and effect. Since the biasing springs can be used to bias each of the engaging members, and the positioning arm can be used to maintain the engaging members at a release position, the shield can be quickly and conveniently locked to or detached from the casing.

BRIEF DESCRIPTION OF THE DRAWINGS

Other features and advantages of the present invention will become apparent in the following detailed description of an embodiment with reference to the accompanying drawings, of which.

DETAILED DESCRIPTION OF THE PREFERRED EMBODIMENT

The above-mentioned and other technical contents, features, and effects of this invention will be clearly presented from the following detailed description of an embodiment in coordination with the reference drawings.

Figure 1:
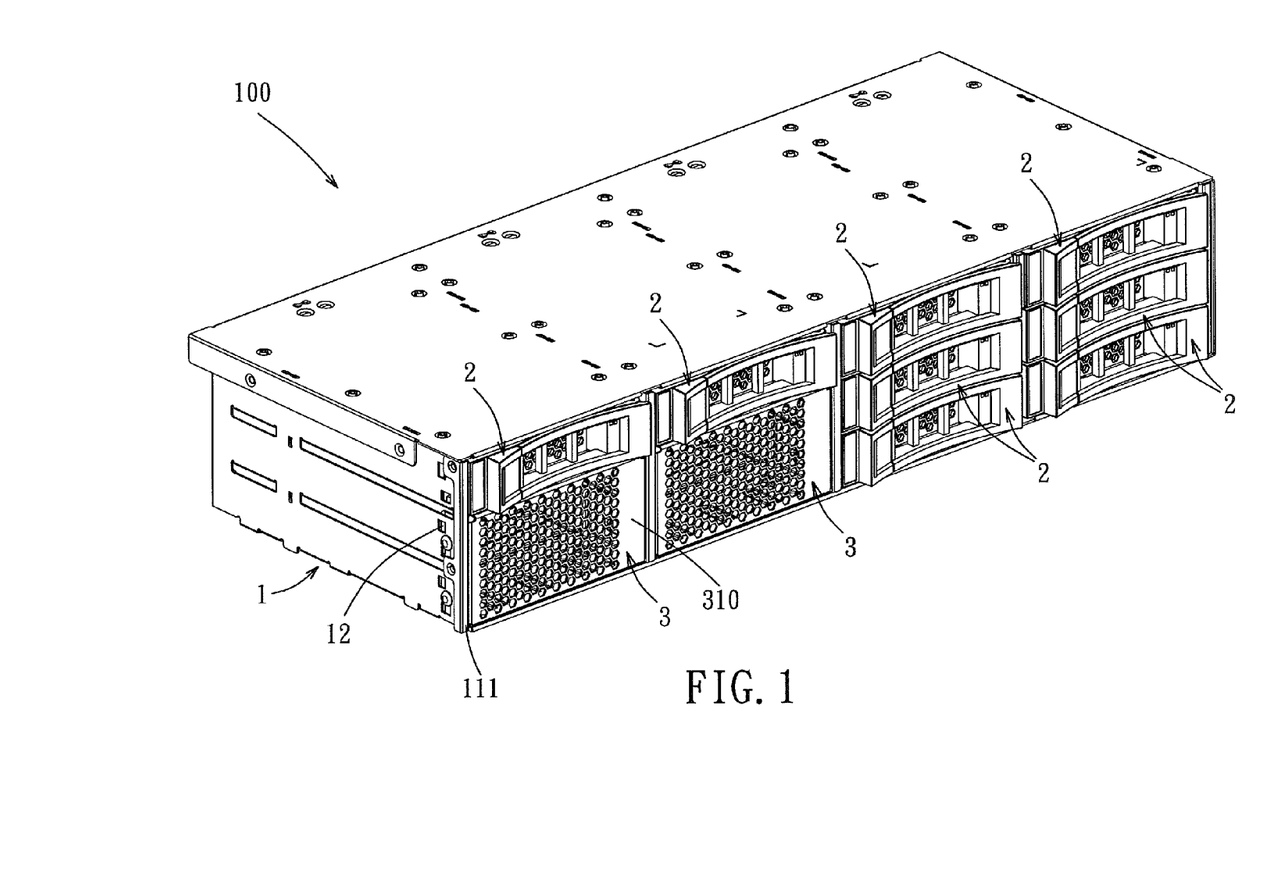
FIG. 1 is a perspective view of a server according to an embodiment of the present invention.
Figure 2:
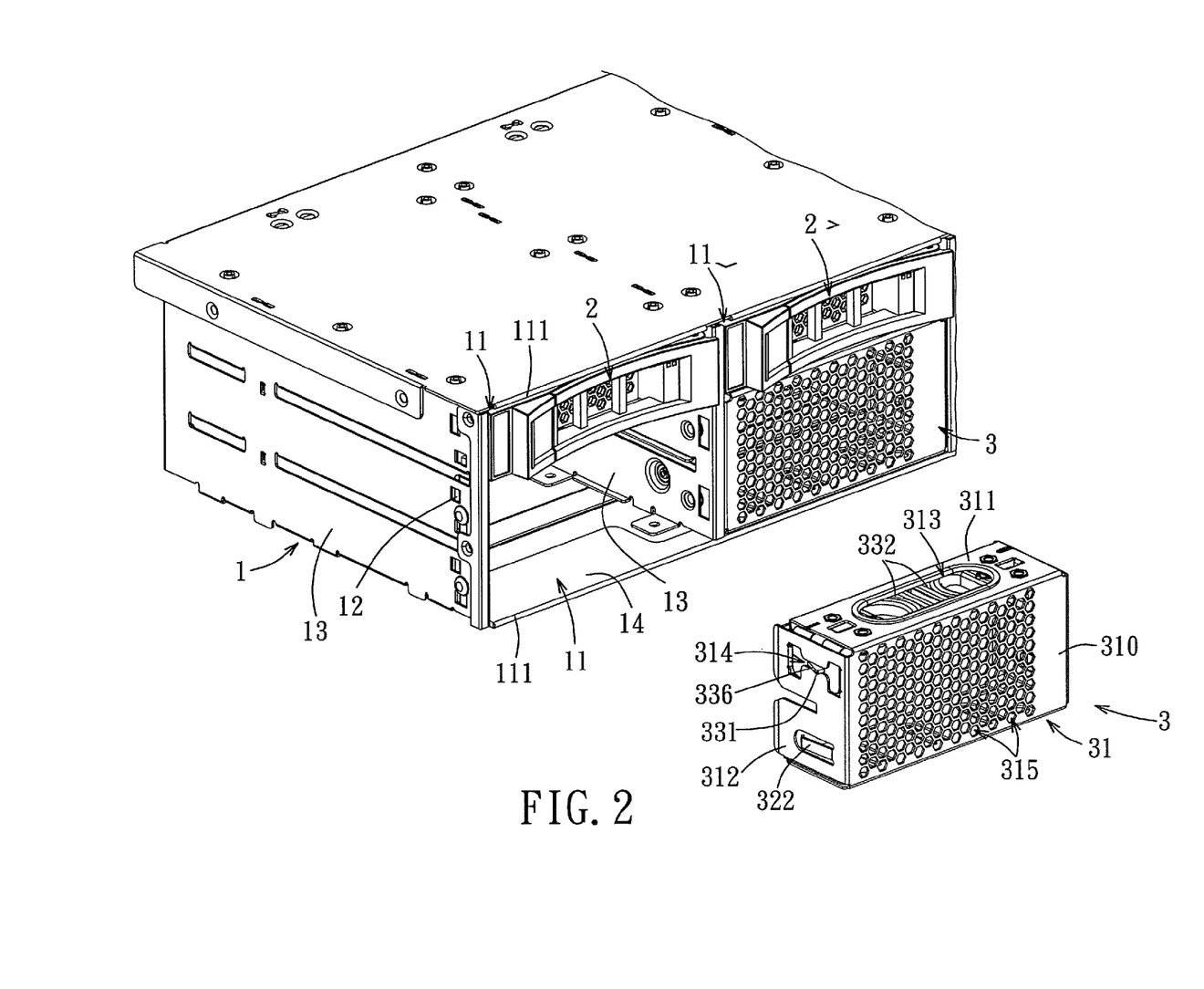
FIG. 2 is a fragmentary, partly exploded perspective view of the server according to the embodiment of the present invention.

FIGS. 1 and 2 illustrate a server 100 according to an embodiment of the present invention. The server 100 includes a casing 1, a plurality of hard disk modules 2 withdrawably disposed in the casing 1 and at least one shield 3 withdrawably disposed in the casing 1. The casing 1 of the server 100 may have height specifications of, such as, 1 U, 2 U, 3 U or 4 U. In this embodiment, the casing 1 has a height specification of, for example, 3 U. 1 U refers to one rack unit for rating the computer room equipment including a server and a network switch, and the height of one rack unit is 44.5 mm.

Figure 3:
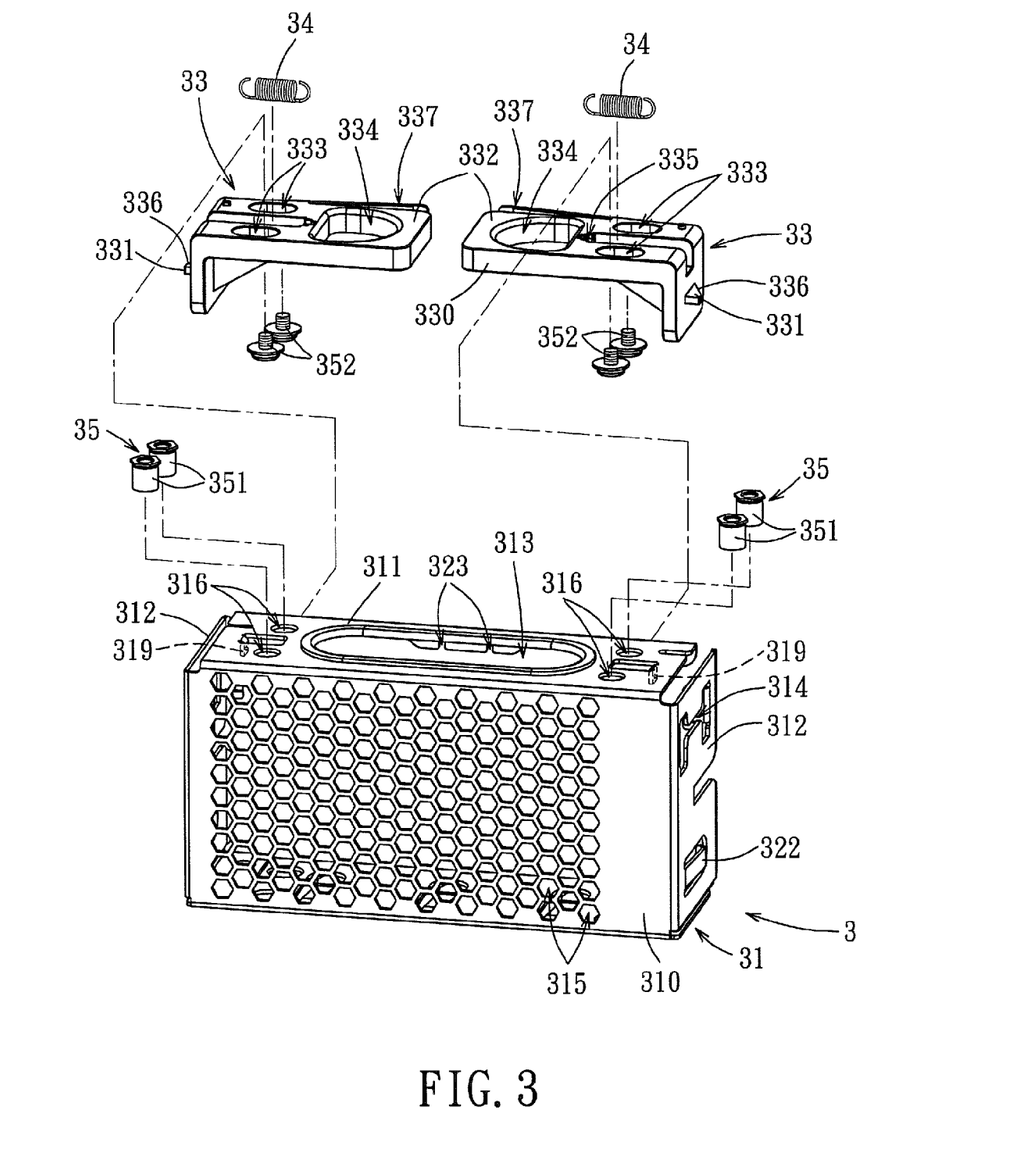
FIG. 3 is an exploded perspective view of a shield of the server according to the embodiment of the present invention.

As shown in FIGS. 1, 2 and 3, the casing 1 is formed with at least one inserting space 11, an opening 111, and two engaging holes 12 (only one of the engaging holes 12 is shown in FIG. 2) spaced apart from each other in the left-to-right direction and in spatial communication with the inserting space 11. The shield 3 includes a shell body 31, two engaging members 33 and two biasing springs 34. The shell body 31 is inserted into the inserting space 11, and shields the opening 111. The shell body 31 includes a base plate 311 and two side plates 312 disposed respectively at left and right sides of the base plate 311. The base plate 311 is formed with a slot 313. Each of the side plates 312 is formed with a through-hole 314 aligned with a respective one of the engaging holes 12. Each of the engaging members 33 is slidable relative to the base plate 311. Each of the engaging members 33 includes an engaging portion 331 extending through the corresponding through-hole 314 and releasably engageable with a respective one of the engaging holes 12, and a pressing portion 332 opposite to the engaging portion 331 and aligned with the slot 313. Each of the biasing springs 34 biases a respective one of the engaging members 33 to move in a direction toward the corresponding through-hole 314. As such, the shell body 31 of the shield 3 can shield the opening 111 when the engaging members 33 engage respectively the engaging holes 12. Moreover, the locking state between the engaging members 33 and the casing 1 can be released by pressing the engaging members 33 to slide toward each other, thus conveniently withdrawing the shield 3 from the inserting space 11 through the opening 111.

Hereinafter, the structure and the assembling and detaching method of the shield 3 of the server 100 are described in details.

As shown in FIGS. 1 and 2, in this embodiment, the casing 1 is formed with a plurality of inserting spaces 11. Each of the inserting spaces 11 has an opening 111. Each of the hard disk modules 2 may be inserted into one of the inserting spaces 11 through the corresponding opening 111. Since the number of the hard disk modules 2 used varies according to different requirements of the server 100, some of the inserting spaces 11 of the casing 1 are in an exposed state when the number of the hard disk modules 2 is less than that of the inserting spaces 11. Alternatively, when the hard disk (not shown) in one of the hard disk modules 2 fails and needs maintenance or replacement, it is necessary to withdraw the one of the hard disk modules 2 from the corresponding inserting space 11, so that the corresponding inserting space 11 is also in the exposed state. The shield 3 may be inserted into one of the exposed inserting spaces 11 through the corresponding opening 111, so that it can shield the corresponding opening 111 to avoid exposure of the one of the inserting spaces 11. The number of the shields 3 used is determined according to the actual number of the exposed inserting spaces 11. For example, the number of the shields 3 of this embodiment is two. Since the structure and the assembling and detaching method of the two shields 3 of this embodiment are the same, only one shield 3 is illustrated hereinafter.

Figure 4:
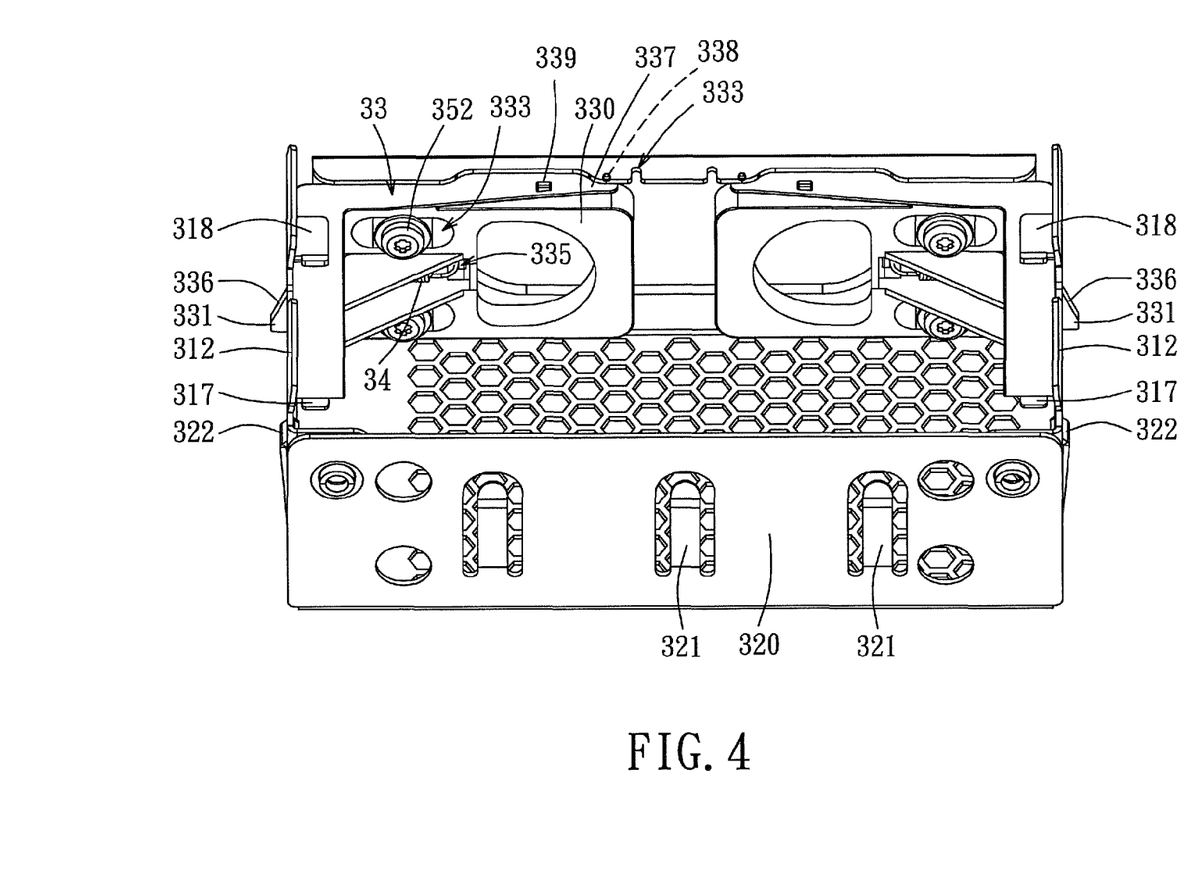
FIG. 4 is a perspective view of the shield of the server according to the embodiment of the present invention.

As shown in FIGS. 2, 3 and 4, the shell body 31 of the shield 3 further includes a front plate 310 connected to the base plate 311 and front ends of two side plates 312 and extending vertically. The front plate 310 shields the opening 111, and is formed with a plurality of heat dissipation holes 315 that are in spatial communication with the inserting space 11 and the outside. The heat generated by the hard disk of the hard disk module 2 during operation may be dissipated to the outside through the heat dissipation holes 315. Similarly, the heat generated by the electronic components (not shown) inside the casing 1 of the server 100 during operation may also be dissipated to the outside through the heat dissipation holes 315.

The base plate 311 extends horizontally, and is formed with four vias 316. Two of the vias 316 are disposed at the right side of the slot 313, and are spaced apart from each other. The other two vias 316 are disposed at the left side of the slot 313, and are spaced apart from each other. The shield 3 includes four joining members 35 extending through the vias 316, respectively. Each of the joining members 35 includes an internally threaded member 351 and a screw 352 engaging the internally threaded member 351. Each of the engaging members 33 is joined on the base plate 311 through two corresponding joining members 35. Each of the engaging members 33 includes a board body 330. The board body 330 is formed with two elongated holes 333 extending in the left-to-right direction. Each elongated hole 333 is aligned with a respective one of the vias 316, and is provided for permitting the corresponding joining member 35 to extend therethrough. Since the internally threaded members 351 extend through the vias 316 and the elongated holes 333 and abut against an outer surface of the base plate 311, and since the screws 352 are screwed on the internally threaded members 351 and abut against the board bodies 330 of the engaging members 33, the engaging members 33 are joined on the base plate 311. Through engagement between the internally threaded member 351 of each joining member 35 and the elongated holes 333, each of the engaging members 33 is slidable relative to base plate 311 along a longitudinal direction of the corresponding elongated hole 333. It should be noted that, in design, the number of the joining members 35 may be changed to two. If this occurs, only one elongated hole 333 needs to be formed in each engaging member 33. In this case, each joining member 35 can also achieve the function of joining each of the engaging members 33 on the base plate 311.

The engaging portion 331 of each engaging member 33 extends from an outer side of the board body 330. An inner side of the board body 330 of each engaging member 33 is formed with a hole 334 in spatial communication with the slot 313. An inner end wall of the board body 330 defining the hole 334 constitutes the pressing portion 332 for a user to press, in such a manner that the user inserts one finger (not shown) into the hole 334 to press the pressing portion 332, so as to push the engaging member 33 away from the corresponding through-hole 314 to thereby disengage the engaging portion 331 from the engaging hole 12. Each of the side plates 312 includes a front blocking plate 317 extending from an inner surface and a rear blocking plate 318 extending from the inner surface and disposed behind and spaced apart from the front blocking plate 317. The front blocking plate 317 is used for slidable contact with a front end of a corresponding one of the engaging members 33. The rear blocking plate 318 is used for slidable contact with a rear end of the corresponding one of the engaging members 33. With the design of the front blocking plate 317 and the rear blocking plate 318, the corresponding engaging member 33 is prevented from spinning when sliding relative to the base plate 311, so that the engaging member 33 is guided to slide along the longitudinal direction of the elongated holes 333.

Each of the biasing springs 34 is a tension spring having two ends respectively hooked on a lobe 319 of the corresponding base plate 311 and in a retaining slot 335 of the corresponding board body 330. Each of the biasing springs 34 biases a corresponding one of the engaging members 33 to move toward the corresponding through-hole 314, so that the engaging portion 331 of each engaging member 33 extends through the corresponding through-hole 314.

The casing 1 includes two side joining plates 13 spaced apart from each other in the left-to-right direction. Each engaging hole 12 is formed in a respective one of the side joining plates 13. The engaging portion 331 of each engaging member 33 is formed with a slope surface 336 facing rearwardly and contactable with the corresponding side joining plate 13. In the process of inserting the shield 3 into the inserting space 11, when the slope surface 336 of each engaging portion 331 comes into contact with the corresponding side joining plate 13, the engaging portion 331 is forced to slide away from the corresponding through-hole 314, so that the shield 3 can be fully inserted into the inserting space 11 through the opening 111.

The shell body 31 of the shield 3 further includes a contact plate 320 extending horizontally from and connected to the front plate 310 and spaced apart from the base plate 311. In this embodiment, the base plate 311 is connected to a top end of the front plate 310, and the contact plate 320 is connected to a bottom end of the front plate 310. The contact plate 320 includes a plurality of first resilient contact pieces 321 spaced apart from each other. Each of the first resilient contact pieces 321 abuts against a bottom plate 14 of the casing 1 that is connected to bottom ends of the side joining plates 13. Each of the side plates 312 includes a second resilient contact piece 322 abutting against the corresponding side joining plate 13 of the casing 1. Since the first resilient contact pieces 321 abut against the bottom plate 14, and since the second resilient contact pieces 322 abut respectively against the side joining plates 13, the shield 3 is locked firmly in the inserting space 11 after it is inserted into the inserting space 11, so as to avoid shaking of the shield 3 under vibration generated during operation of the hard disk module 2.

Figure 5:
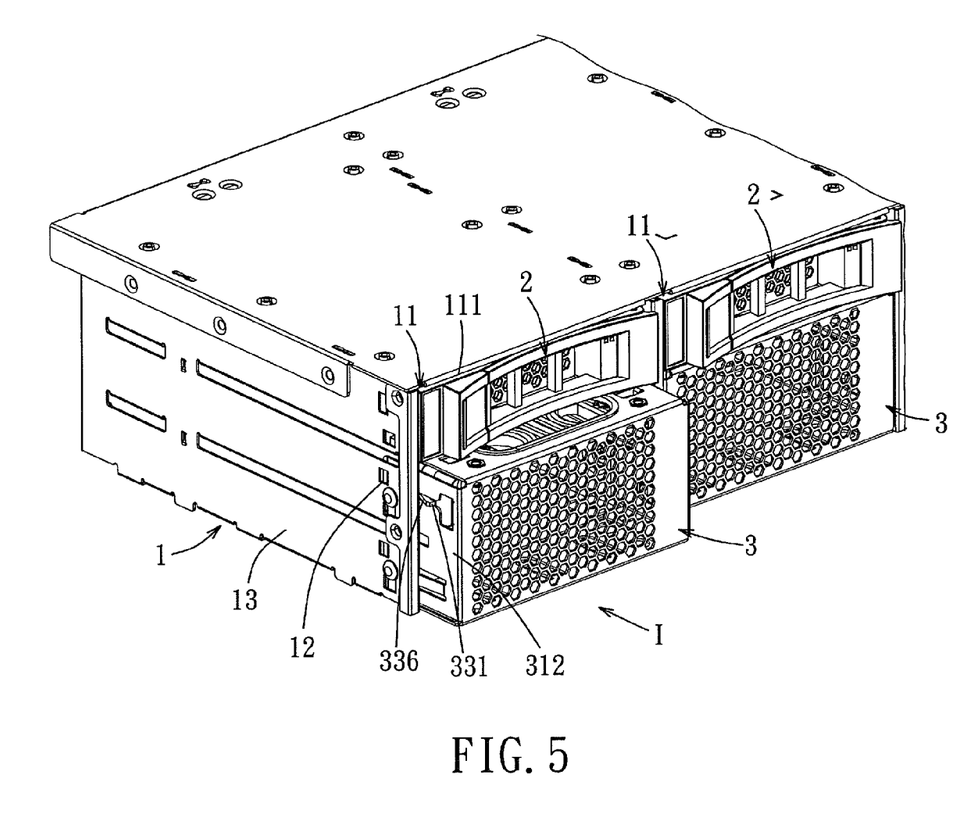
FIG. 5 is a fragmentary perspective view of the server according to the embodiment of the present invention.
Figure 6:
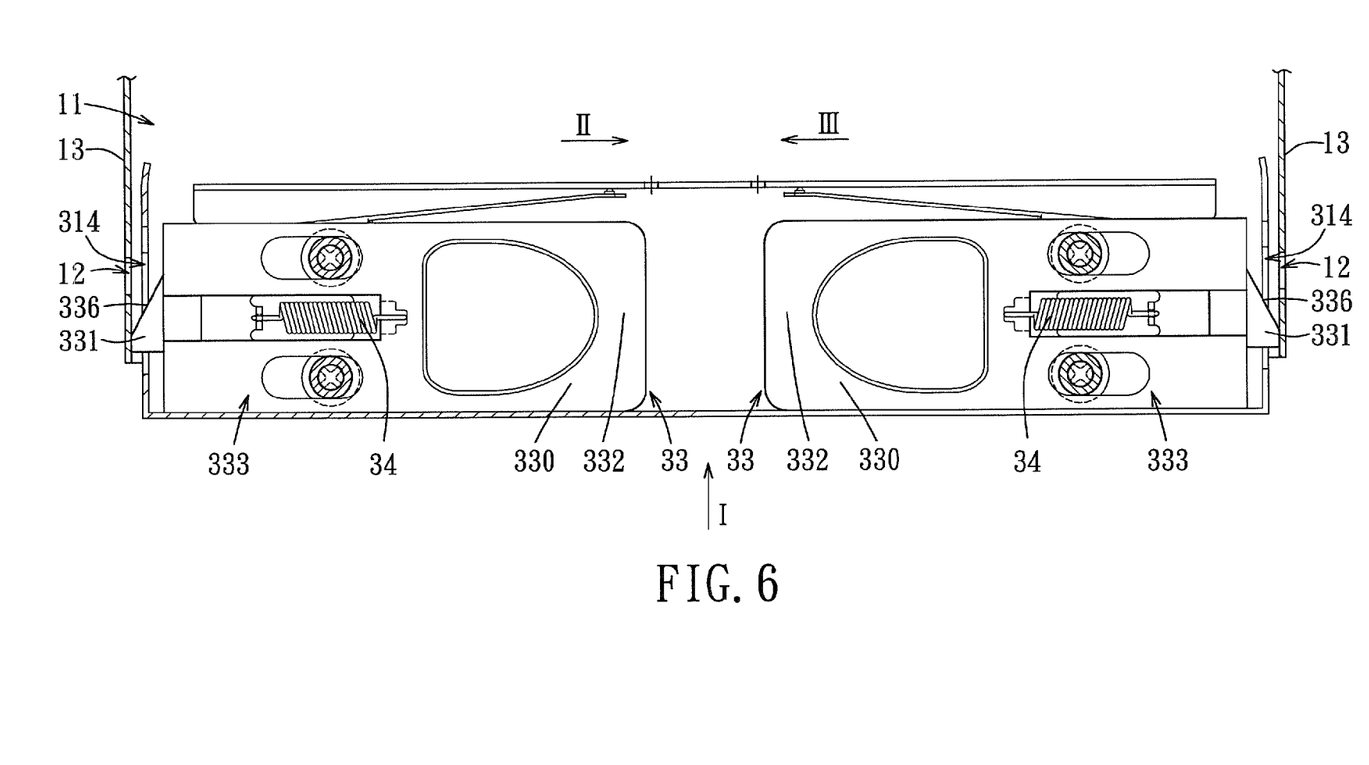
FIG. 6 is a fragmentary, partly sectional view of the shield of the server according to the embodiment of the present invention, illustrating that each of two engaging members is at a locking position.
Figure 7:
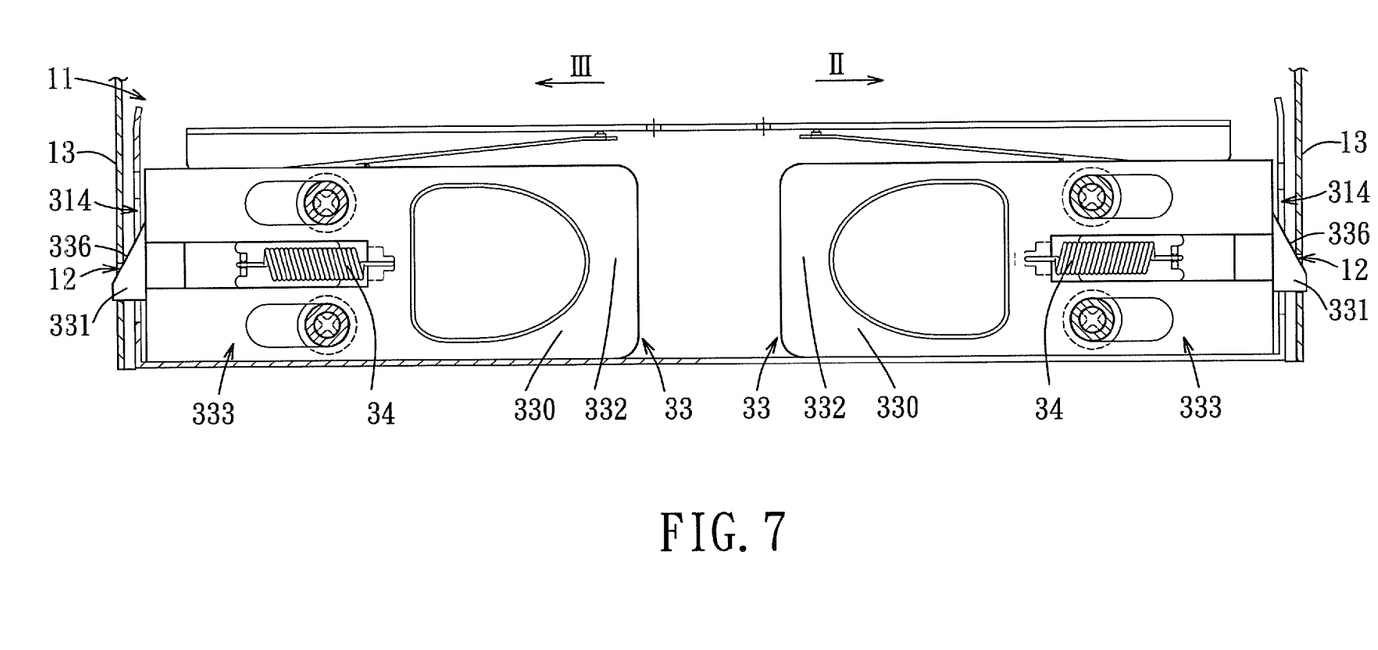
FIG. 7 is a fragmentary, partly sectional view of the server according to the embodiment of the present invention, illustrating that each of the engaging members is at a release position.

As shown in FIGS. 2, 5, 6 and 7, the shield 3 is inserted into the inserting space 11 through the opening 111 in a direction (I) (see FIG. 5). When the shield 3 moves to a position in which the slope surface 336 of each engaging portion 331 contacts a front end of each side joining plate 13, each side joining plate 13 applies a lateral force component on the slope surface 336 to result in retraction of the engaging portion 331, so that two engaging members 33 respectively slide in directions (II, III) toward each other. Hence, the two biasing springs 34 are stretched to deform. When the shield 3 moves to a position in which the engaging portion 331 of each engaging member 33 is aligned with the engaging hole 12 of the corresponding side joining plate 13, due to the return force of a corresponding one of the biasing springs 34, the two engaging members 33 respectively slide away from each other in directions (III, II), so that each of the engaging members 33 slide to a locking position (as shown in FIG. 7) in which each of the engaging portions 331 is engaged within a corresponding one of the engaging holes 12. Consequently, an assembly of each engaging member 33 and an adjacent one of the side joining plates 13 is in a locking state, so that the shield 3 is locked firmly in the inserting space 11, and shields the opening 111 by means of the front plate 310 (as shown in FIG. 1).

Figure 8:
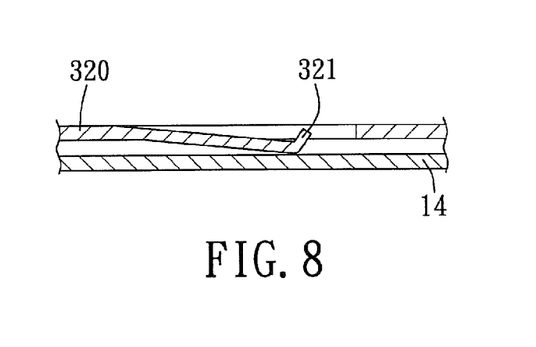
FIG. 8 is a fragmentary sectional view of the server according to the embodiment of the present invention.
Figure 9:
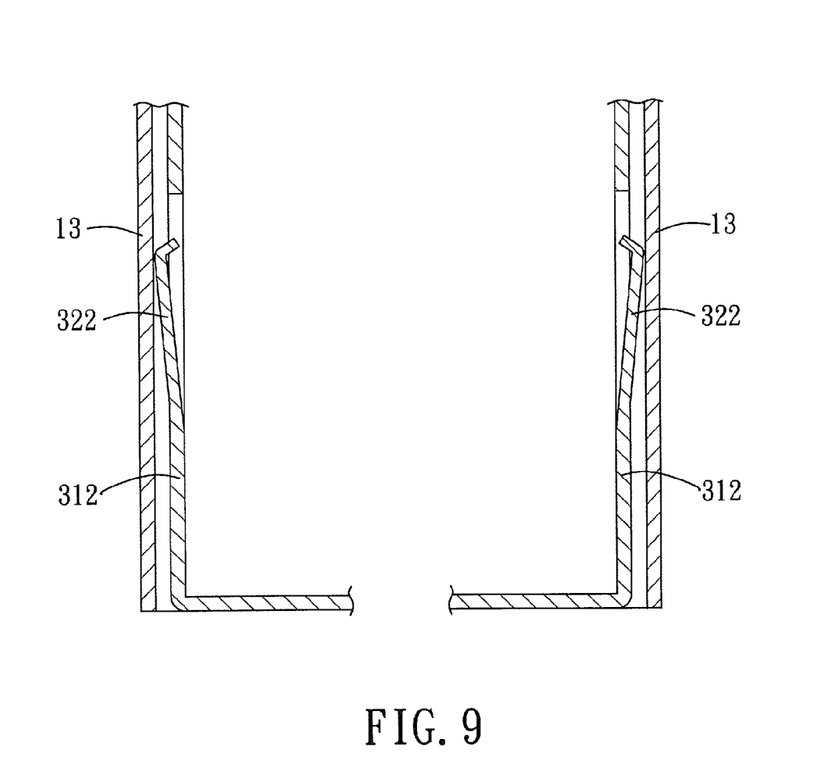
FIG. 9 is another fragmentary sectional view of the server according to the embodiment of the present invention.

As shown in FIGS. 8 and 9, when the shield 3 is disposed in the inserting space 11 (as shown in FIG. 7), each of the first resilient contact piece 321 and the second resilient contact piece 322 abuts against a corresponding one of the bottom plate 14 and the side joining plate 13, so that the shield 3 can be locked firmly in the inserting space 11 and cannot shake under vibration.

Figure 10:
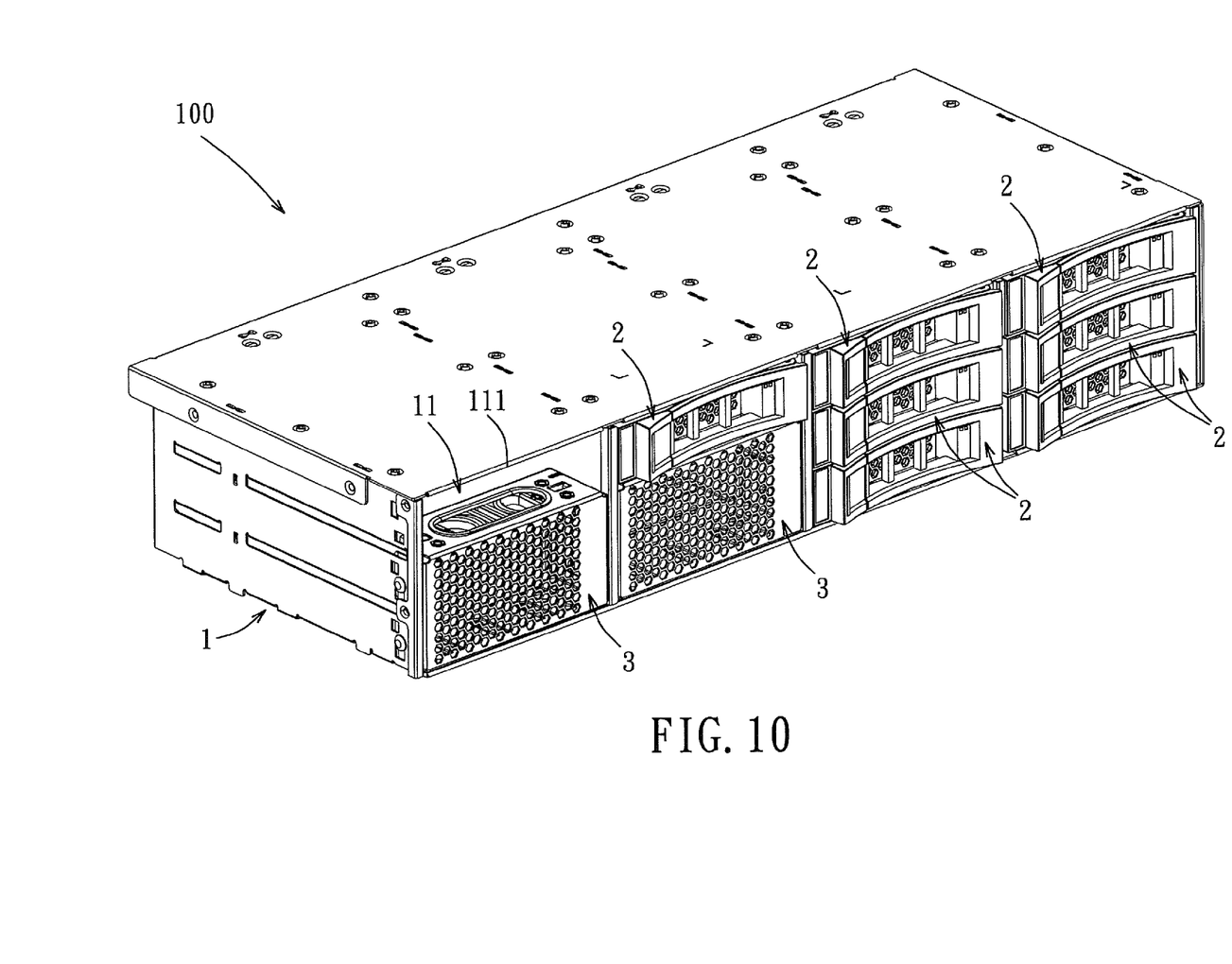
FIG. 10 is a perspective view of the server according to the embodiment of the present invention, wherein a hard disk module is removed.
Figure 11:
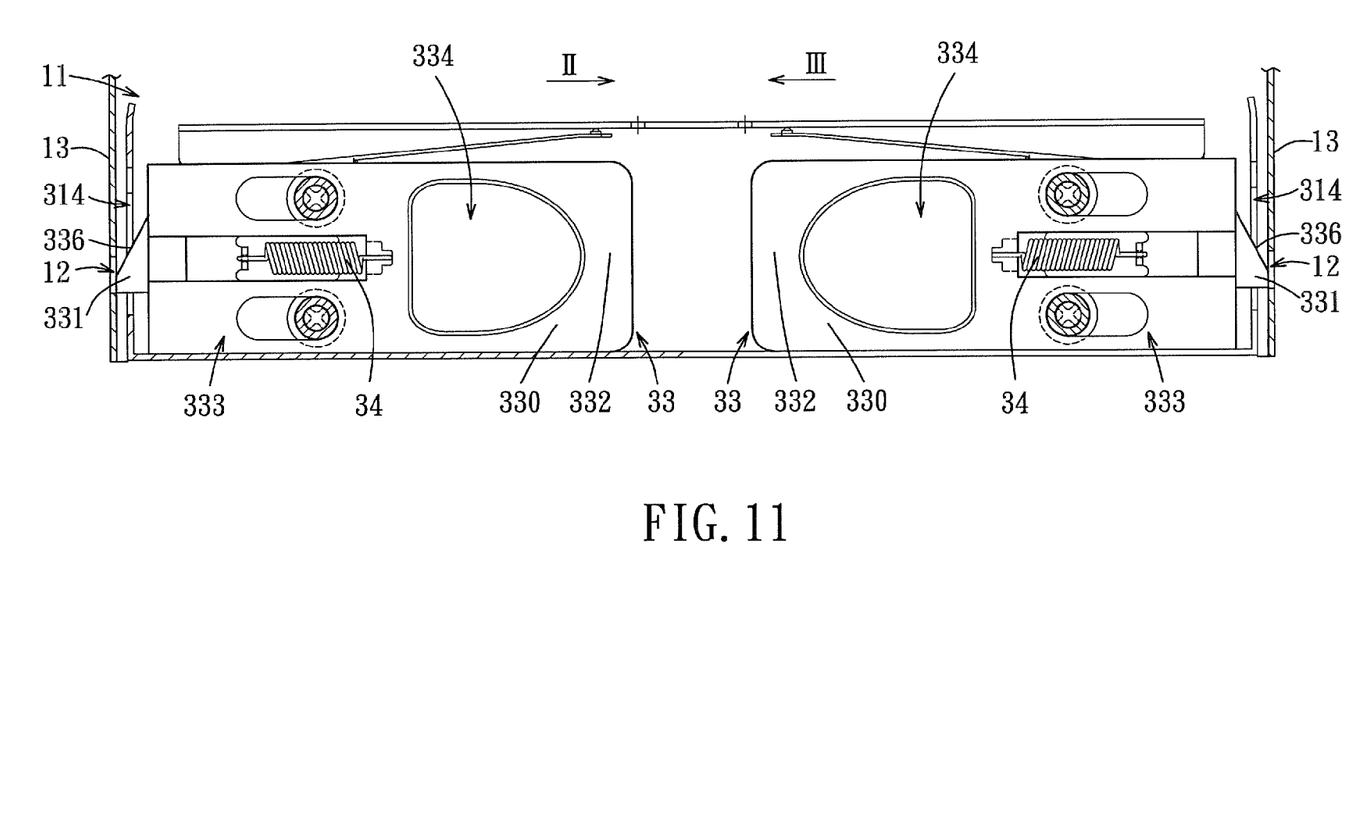
FIG. 11 is a fragmentary sectional view of the server according to the embodiment of the present invention, illustrating that each of the engaging members is at the release position.
Figure 12:
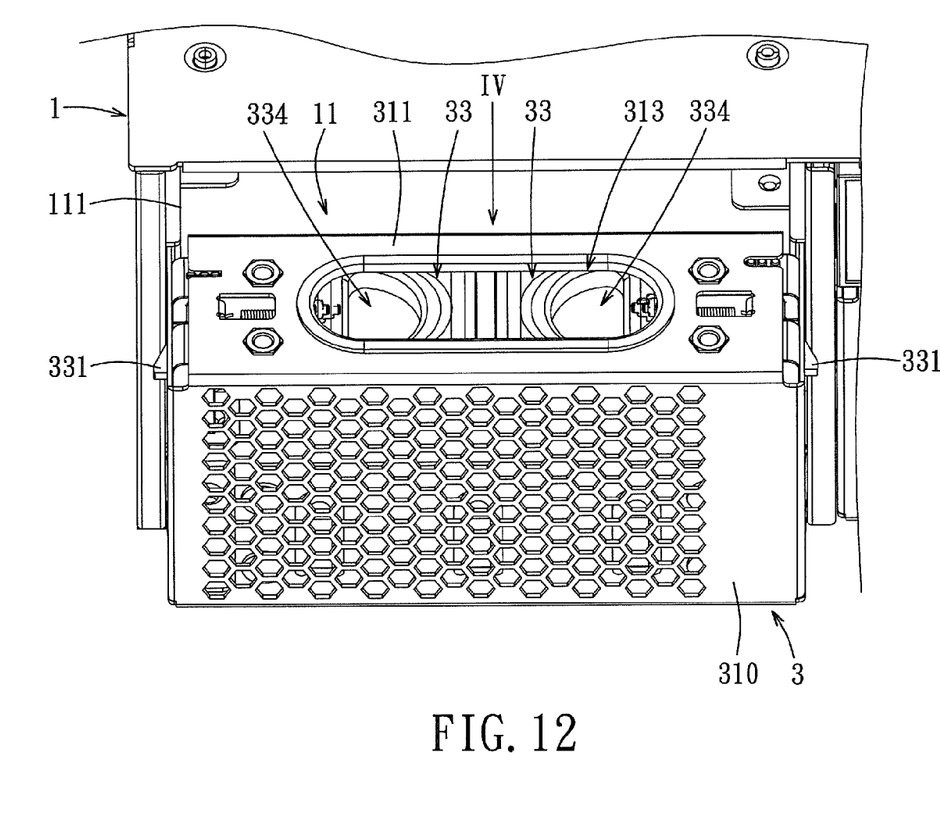
FIG. 12 is a fragmentary perspective view of the server according to the embodiment of the present invention.

As shown in FIGS. 10, 11 and 12, when it is desired to withdraw the shield 3 from the inserting space 11, The hard disk module 2 (as shown in FIG. 5) disposed directly above the shield 3 is first withdrawn, so that the inserting space 11 disposed directly above the shield 3 is in the exposed state. Next, one hand of the user is moved into the inserting space 11 disposed directly above the shield 3, and two fingers of the hand are inserted through the slot 313 and into the holes 334 of the two engaging members 33, respectively, to press the pressing portions 332 to thereby move the two engaging members 33 toward each other in directions (II, III), respectively. When each of the engaging members 33 slides to a release position (as shown in FIG. 11) in which the corresponding engaging portion 331 is disengaged from the corresponding engaging hole 12, the assembly of each of the engaging members 33 and an adjacent one of the side joining plates 13 is in a release state. Subsequently, the shield 3 is withdrawn from the inserting space 11 through the opening 111 in a direction (IV) (see FIG. 12), in such a manner that the pressing portions 332 are pressed continuously.

Figure 13:
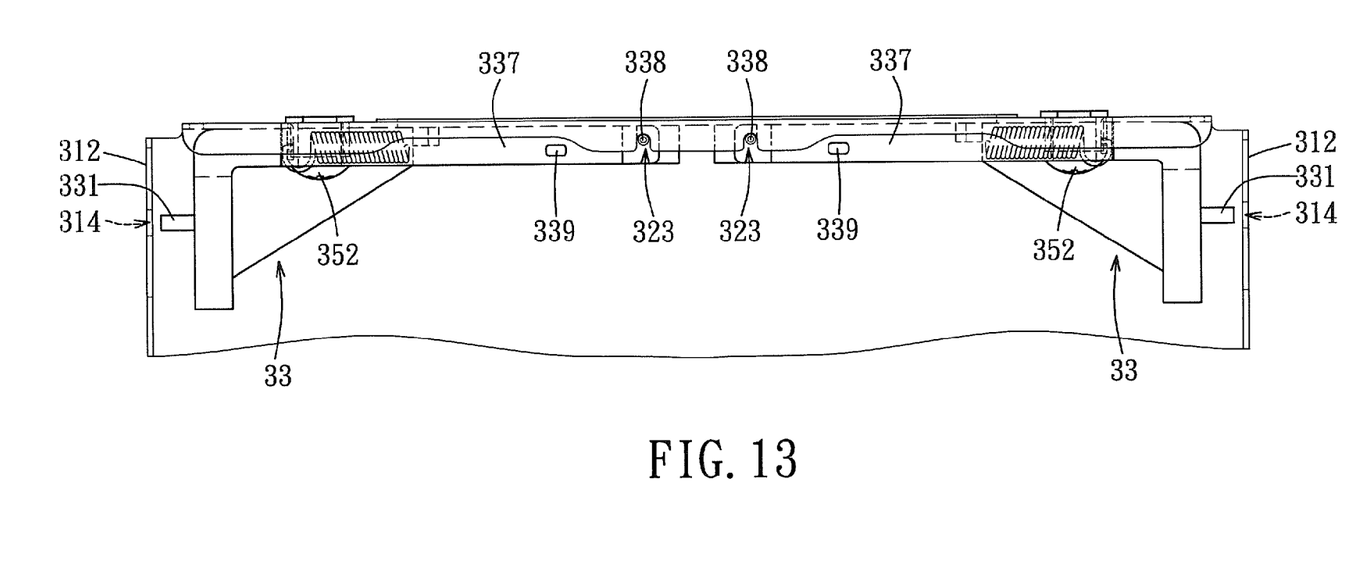
FIG. 13 is a fragmentary schematic view of the shield of the server according to the embodiment of the present invention, illustrating engagement between two engaging blocks and two positioning grooves.

As shown in FIGS. 3, 4 and 13, the base plate 311 of this embodiment is formed with two positioning grooves 323 at a rear side thereof. Each of the engaging members 33 further includes a resilient positioning arm 337 extending from a rear end of the board body 330 and formed with a positioning block 338, which is disposed at a distal end thereof, and which is engageable within the corresponding positioning groove 323, so that a corresponding one of the engaging members 33 is maintained at the release position. In the process of detaching the shield 3 from the inserting space 11, the user presses the pressing portions 332 of the two engaging members 33 to move the two engaging members 33 to the release positions. Then, a projection 339 of each positioning arm 337 is pulled upwardly by one of the remaining fingers of the hand, so that the positioning block 338 of the positioning arm 337 is engaged within the corresponding positioning groove 323, thereby maintaining each of the engaging members 33 at the release position. Thus, the user does not need to continuously press the pressing portion 332 in the process of withdrawing the shield 3 from the inserting space 11 in the direction (IV) (as shown in FIG. 12), which effectively improves the convenience in detaching.

Figure 14:
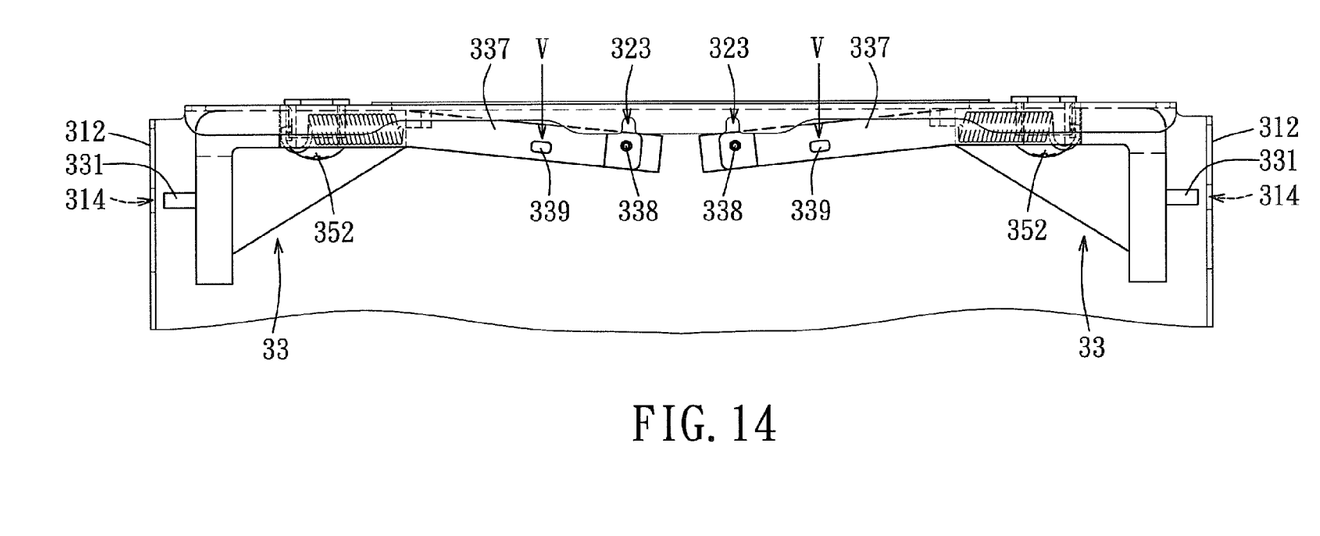
FIG. 14 is a fragmentary schematic view of the shield of the server according to the embodiment of the present invention, illustrating disengagement of the positioning blocks from the positioning grooves.

As shown in FIGS. 13 and 14, after the shield 3 is withdrawn from the inserting space 11, as shown in FIG. 12, the user can push downwardly the projection 339 of each positioning arm 337 in a direction (V), so that the positioning block 338 of the corresponding positioning arm 337 is disengaged from the corresponding positioning groove 323. When the positioning block 338 of each positioning arm 337 is disengaged from the corresponding positioning groove 323, due to the return force of each of the biasing springs 34 (as shown in FIG. 7), each of the engaging members 33 is returned to the locking position to thereby project from the corresponding through-hole 314, as shown in FIG. 7.

It should be noted that, although the base plate 311 of the shell body 31 in this embodiment is connected to the top end of the front plate 310, in design, the base plate 311 may be connected to the bottom end of the front plate 310, such that the shield 3 can be inserted into one exposed inserting space 11 disposed directly above the hard disk module 2. Furthermore, since the horizontally extending base plate 311 is connected to the top end of the vertically extending front plate 310, when the shield 3 is inserted into the inserting space 11, the structure of each engaging member 33 is not exposed, thereby preventing each engaging member 33 from being moved undesirably to the release position. Therefore, the shield 3 may be locked firmly in the inserting space 11.

In view of the foregoing descriptions, in the server 100 of this embodiment, the user can quickly and conveniently lock the shield 3 on the casing 1 by means of the biasing springs 34 biasing the engaging members 33 to the locking positions. Furthermore, with the design of maintaining the engaging members 33 at the release positions by the positioning arms 337, the user can quickly and conveniently detach the shield 3 from the casing 1. Thus, the shield 3 can be conveniently mounted to and detached from the casing 1, so that the object of the present invention is achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A shield adapted to be locked in a casing, the casing being formed with an inserting space, an opening, and two engaging holes spaced apart from each other in a left-to-right direction and in spatial communication with the inserting space, said shield comprising: a shell body adapted to be inserted into the inserting space so as to shield the opening, and including a base plate and two side plates disposed respectively at left and right sides of said base plate, wherein said base plate is formed with a slot and each of said side plates is formed with a through-hole adapted to be aligned with a respective one of the engaging holes; two engaging members, each slidable relative to a said base plate and including an engaging portion extending through said through-hole and adapted to be releasably engageable with a respective one of the engaging holes, and a pressing portion opposite to said engaging portion and aligned with said slot; and two biasing springs, each biasing a respective one of said engaging members to move in a direction toward said through-hole; wherein said base plate is formed with two positioning grooves, each of said engaging members including a positioning arm formed with a positioning block engageable with a corresponding one of said positioning grooves such that, when said positioning block is engaged within the corresponding one of said positioning grooves, a corresponding one of said engaging members is at a release position where said engaging portion is disengaged from the respective one of the engaging holes.

2. The shield as defined in claim 1, wherein said positioning arm of each of said engaging members further includes a projection pushable to disengage said positioning block from the corresponding one of said positioning grooves.

3. The shield as defined in claim 2, further comprising two joining members for joining said two engaging members respectively to said base plate, wherein each of said engaging members is formed with an elongated hole for said joining member to extend therethrough in the left-to-right direction, each of said engaging members being slidable relative to said base plate in a longitudinal direction of a corresponding one of said elongated holes.

4. The shield as defined in claim 3, wherein each of said engaging portions of said engaging members is formed with a slope surface adapted to be contactable with the casing to allow each of said engaging portions to slide in a direction away from said through-hole of a corresponding one of the side plates.

5. The shield as defined in claim 4, wherein each of said side plates includes a front blocking plate disposed for slidable contact with a front end of a corresponding one of said engaging members, and a rear blocking plate disposed for slidable contact with a rear end of each of the corresponding one of said engaging members.

6. The shield as defined in claim 4, wherein said shell body further includes a front plate connected to said base plate and front ends of two side plates and extending vertically, said front plate being adapted to shield the opening and being formed with a plurality of heat dissipation holes that are adapted to be in spatial communication with the inserting space and the outside, said base plate extending horizontally.

7. The shield as defined in claim 6, wherein said shell body further includes a contact plate extending horizontally from and connected to said front plate and spaced apart from said base plate, said contact plate including a first resilient contact piece adapted to abut against the casing, each of said side plates including a second resilient contact piece adapted to abut against the casing.

8. A server comprising: a casing formed with an inserting space, an opening, and two engaging holes spaced apart from each other in a left-to-right direction and in spatial communication with said inserting space; a plurality of hard disk modules disposed in said casing; and a shield including a shell body inserted into said inserting space so as to shield said opening, and including a base plate and two side plates disposed respectively at left and right sides of said base plate, wherein said base plate is formed with a slot, and each of said side plates is formed with a through-hole aligned with a respective one of said engaging holes, two engaging members, each slidable relative to said base plate, and including an engaging portion extending through said through-hole of a corresponding one of said side plates and releasably engageable with a respective one of said engaging holes, and a pressing portion opposite to said engaging portion and aligned with said slot, and two biasing springs, each biasing a respective one of said engaging members to move in a direction toward said through-hole; wherein said base plate is formed with two positioning grooves, each of said engaging members including a positioning arm formed with a positioning block engageable with a corresponding one of said positioning grooves such that, when said positioning block is engaged within the corresponding one of said positioning grooves, a corresponding one of said engaging members is at a release position where said engaging portion is disengaged from the respective one of said engaging holes.

9. The server as defined in claim 8, wherein said positioning arm of each of said engaging members further includes a projection pushable to disengage said positioning block from the corresponding one of said positioning grooves.

10. The server as defined in claim 9, wherein said shield further includes two joining members for joining said two engaging members respectively to said baseplate, each of said engaging members being formed with an elongated hole for a corresponding one of said joining members to extend therethrough in the left-to-right direction, each of said engaging members being slidable relative to said base plate along a longitudinal direction of said elongated hole.

11. The server as defined in claim 10, wherein each of said engaging portions of said engaging members is formed with a slope surface contactable with said casing to allow each of said engaging portions to slide in a direction away from said through-hole of a corresponding one of said side plates.

12. The server as defined in claim 11, wherein each of said side plates includes a front blocking plate for slidable contact with a front end of a corresponding one of said engaging members, and a rear blocking plate for slidable contact with a rear end of the corresponding one of said engaging members.

13. The server as defined in claim 11, wherein said shell body further includes a front plate connected to said base plate and front ends of two side plates and extending vertically, said front plate shielding said opening and being formed with a plurality of heat dissipation holes that are adapted to be in spatial communication with said inserting space and the outside, said base plate extending horizontally.

14. The server as defined in claim 13, wherein said shell body further includes a contact plate extending horizontally from and connected to said front plate and spaced apart from said base plate, said contact plate including a first resilient contact piece abutting against said casing, each of said side plates including a second resilient contact piece abutting against said casing.

* * * * *